(12) United States Patent
Cushing

(10) Patent No.: US 6,622,716 B2
(45) Date of Patent: Sep. 23, 2003

(54) GRILL HEAT MISER

(76) Inventor: William L. Cushing, 13955 Malabar Ave., White Rock B.C. (CA), V4B 3A5

(*) Notice: Subject to any disclaimer, the term of this patent is extended or adjusted under 35 U.S.C. 154(b) by 93 days.

(21) Appl. No.: 10/002,691

(22) Filed: Dec. 5, 2001

(65) Prior Publication Data
US 2003/0101981 A1 Jun. 5, 2003

(51) Int. Cl.[7] ............................................. F24C 3/00
(52) U.S. Cl. .............................. 126/41 R; 126/214 D
(58) Field of Search ....................... 126/41 R, 214 D, 126/14, 25 R

(56) References Cited

U.S. PATENT DOCUMENTS

| | | | |
|---|---|---|---|
| 674,991 A | * 5/1901 | Williams | ............ 454/289 |
| 1,449,490 A | 3/1923 | Barbour | |
| 2,786,463 A | 3/1957 | Vincent | |
| D192,625 S | 4/1962 | Keal | |
| 4,512,249 A | 4/1985 | Mentzel | |
| 4,726,349 A | * 2/1988 | Gehrke | ............ 126/25 R |
| 4,962,696 A | 10/1990 | Gillis | |
| 5,285,770 A | * 2/1994 | Kim | ............ 126/25 B |
| D379,286 S | 5/1997 | Fincher | |
| 5,755,151 A | 5/1998 | Nowicke, Sr. | |
| 5,878,739 A | * 3/1999 | Guidry | ............ 126/25 R |
| D443,472 S | 6/2001 | Pai | |
| 6,328,028 B1 | * 12/2001 | Cayse et al. | ............ 126/25 R |

* cited by examiner

*Primary Examiner*—Alfred Basichas
(74) *Attorney, Agent, or Firm*—Randal D. Homburg

(57) ABSTRACT

The invention is a device for reducing the concentration of heat to a smaller area in a gas or charcoal grill, the device being a formed metal hood fitting within the grill directly over a heat source having a chimney which reduces and concentrates the heat to a smaller area on the cooking grill surface, reducing the amount of fuel required to cook food.

2 Claims, 2 Drawing Sheets

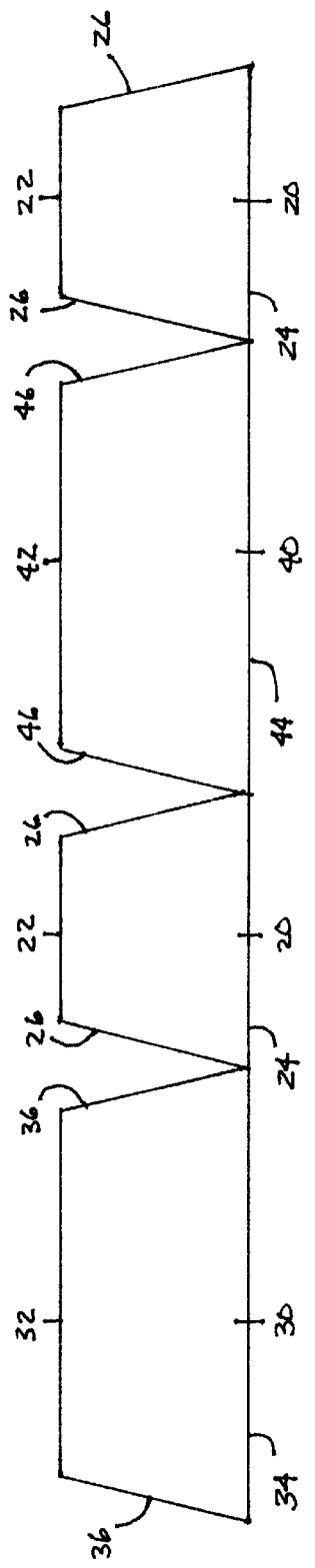
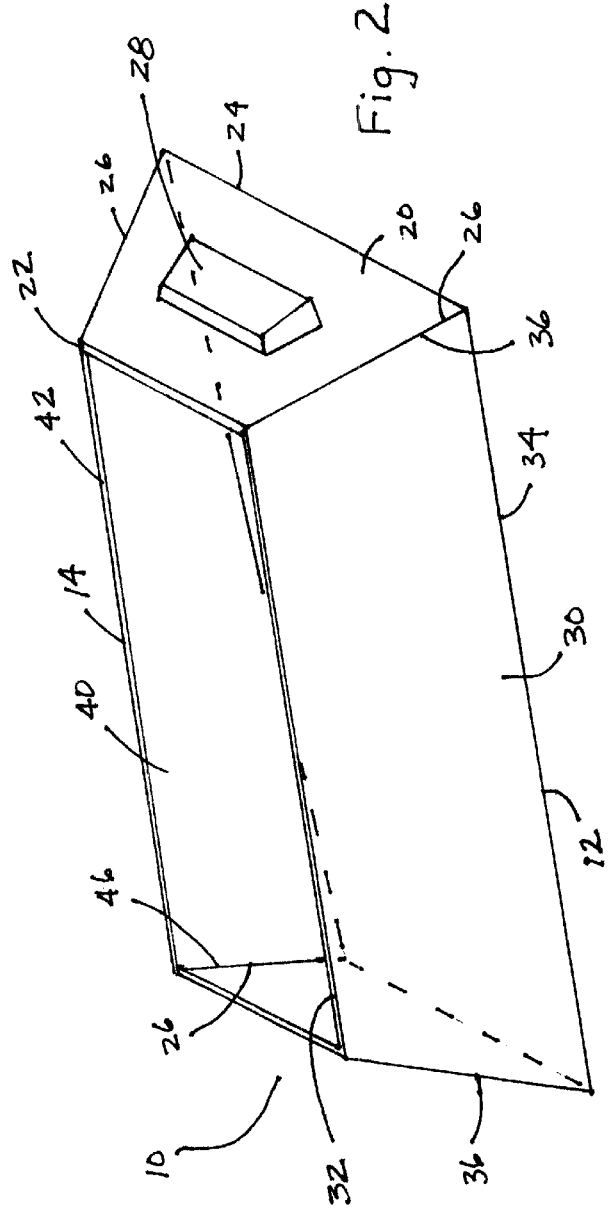

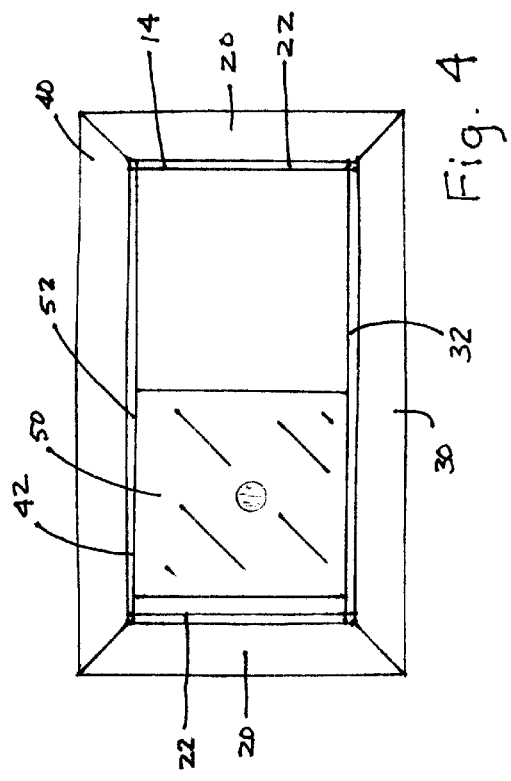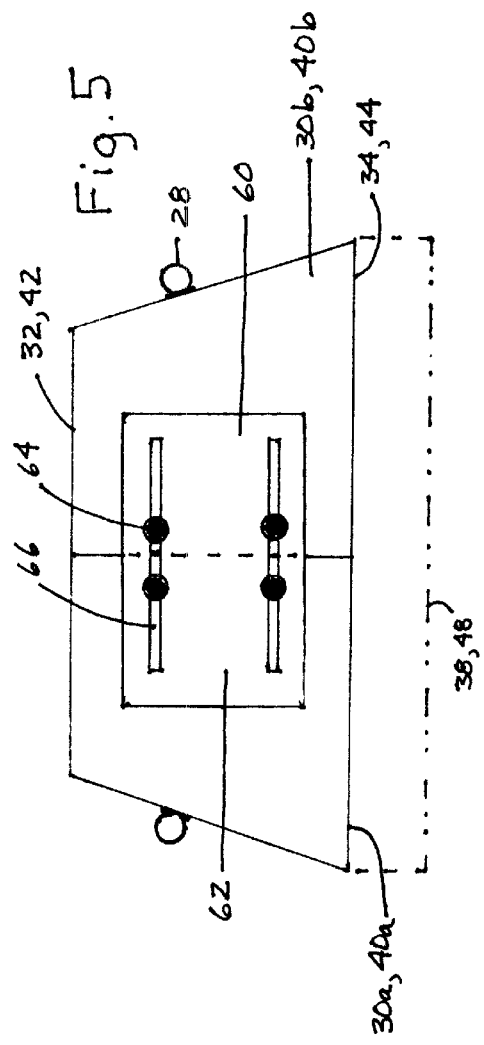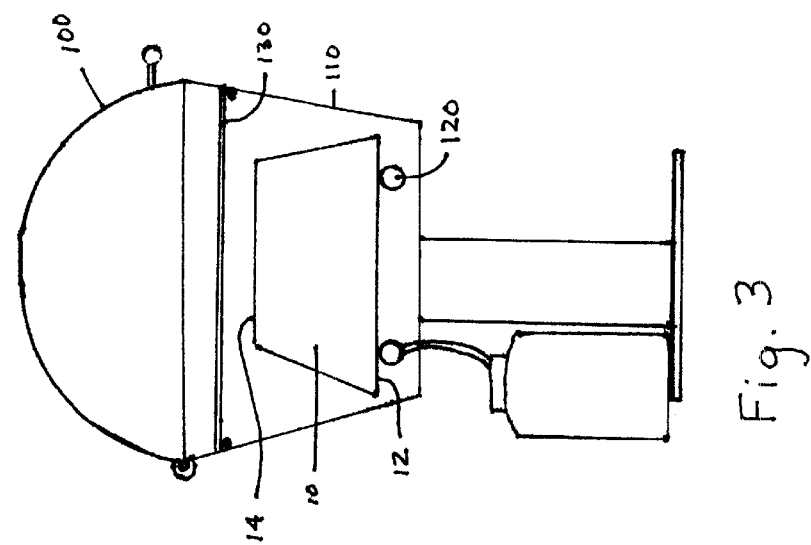

GRILL HEAT MISER

CROSS REFERENCE TO RELATED APPLICATIONS

None

I. BACKGROUND OF THE INVENTION

1. Field of Invention

The invention is a device for reducing the concentration of heat to a smaller area in a gas or charcoal grill, the device being a formed metal hood fitting within the grill directly over a heat source having a chimney which reduces and concentrates the heat to a smaller area on the cooking grill surface, reducing the amount of fuel required to cook food.

2. Description of Prior Art

The following United States patents were discovered and are disclosed within this application for utility patent. All relate to grill devices and grill hoods, primarily. Two design patents, U.S. Pat. No. D 379,286 to Fincher and U.S. Pat. No. D 443,472 to Pai, disclose ornamental designs for grill lids, which appear to have some domed configuration with handles and apparent heat baffles to regulate heat outflow, such grill lids situated on top of the grill.

In U.S. Pat. No. 2,786,463 to Vincent, discloses a barbeque grill with abase, a loose fitting lid having a baffle and a handle, and a grate suspended within the base by fastening elements. In three U.S. Pat. No. 5,755,151 to Nowicke, Sr., U.S. Pat. No. 4,962,696 to Gillis and U.S. Pat. No. 4,512,249 to Mentzel, conversion devices to convert a barbeque grill to a smoking device for smoking meats, is disclosed, each device fitting on top of a grill. The Mentzel '249 and Nowicke, Sr. '151 devices both include a cylindrical sleeve fitting between the grill and the lid extending the distance between the heat source and the cooking surface. Gillis '696 includes a multi-level device sitting on top of a patio grill accommodating several layers of meats and a smoking pan to prevent excessive dehydration.

In U.S. Pat. No. 1,449,490 to Barbour, a device is disclosed which discloses a device which may be utilized as a cooking device, which has a fuel hopper allowing for a controlled supply of fuel for long-term burning and production of heat from combustion.

II. SUMMARY OF THE INVENTION

The primary objective of the invention is to provide a device to reduce the amount of cooking fuel and time required to cook food on an outdoor grill by a formed insert applied between the cooking surface and the heat source, wherein a smaller portion of the cooking surface is required and the heat from the heat source is more concentrated and focused on the reduced cooking surface area.

A second objection of the invention is to provide the device with a means of directing the concentrated heat to a varied area on the cooking surface. This device is distinguished from prior art due to it having the ability to gather heat from a below heat source and directing it to a reduced and specific area on the grill, economizing the cooking space and directing the focused heat to an optimal cooking area. It may also be used to direct heat away from the food on the grill surface providing an indirect heat to food to which a slower cooking is desired, i.e., roasting as opposed to grilling.

III. DESCRIPTION OF THE DRAWINGS

The following drawings are submitted with this utility patent application.

FIG. 1 is a view of the invention in expanded form.

FIG. 2 is a perspective view of the invention.

FIG. 3 is a view of the invention within a patio grill.

FIG. 4 is a top view of the invention including the slide plate.

FIG. 5 is a view of the means for adjusting the front panel and rear panel.

IV. DESCRIPTION OF THE PREFERRED EMBODIMENT

The invention, as shown in FIGS. 1–5 of the drawings, is a device for insertion within a base portion 110 of a patio grill 100, for placement between a heat source 120 and a grill surface 130, concentrating the cooking heat and reducing the consumption of cooking fuel, the device 10 comprising essentially two trapezoid shaped side panels 20, a trapezoid shaped front panel 30 and a trapezoid shaped rear panel 40 connected on respective non-parallel side edges 26, 36, 46, forming a pyramid-shaped chimney, the assembled device 10 having a base perimeter 12 greater than an upper perimeter 14. The base perimeter 12 must allow for insertion of the device 10 completely within the base portion 110 of the patio grill 100.

More specifically, as shown in FIG. 1 of the drawings, the two side panels 20, the front panel 30 and the rear panel 40 are trapezoid-shaped having a respective upper edge 22, 32, 42, parallel with a respective lower edge 24, 34, 44, with the respective non-parallel side edges 26, 36, 46, tapering from the lower edge 24, 34, 44, to upper edge 22, 32, 42. Adjacent side edges (26 and 36, 26 and 46) are attached together forming the pyramid-shaped chimney, as shown in FIG. 2 of the drawings. The lower edges 24, 34, 44, form the base perimeter 12 and the upper edges 22, 32, 42, form the upper perimeter 14. The side panels 20 may include handles 28 for lifting and placing the device within the patio grill 100. When placed in the patio grill 100, the base perimeter 12 seated above a heat source 120 within the patio grill with the upper perimeter 14 situated below a grill surface 130 within the patio grill 100, as indicated in FIG. 3 of the drawings.

In one embodiment, shown in FIG. 4 of the drawings, the device 10 may include a slide plate 50 within the upper perimeter 14 having a means 52 of sliding engagement with the upper edge 32 of the front panel 30 and the upper edge 42 of the rear panel 40, further restricting the heat output of the device through the upper perimeter 14 below the grill surface 130. In another embodiment, the device may have a means 60 for adjusting a width 38 of the front panel 30 and width 48 of the rear panel 48 allowing the device to be used within patio grills of varied size and shape. Such means 60 may include each front panel 30 and rear panel 40 being provided respectively in two divided sections 30a and 30b, 40a and 40b, with an adjusting panel 62 having a plurality of riveted bats 64 engaging linear slots 66 in each of the two divided sections 30a, 30b, 40a and 40b, of the front panel 30 and rear panel 40, allowing such front panel 30 and the rear panel 40 to expand and contract.

While the invention has been particularly shown and described with reference to a preferred embodiment thereof, it will be understood by those skilled in the art that changes in form and detail may be made therein without departing from the spirit and scope of the invention.

What is claimed is:

1. A device for insertion within a base portion of a patio grill, placed between a heat source and a grill surface of the patio grill the device comprising:

two trapezoid-shaped side panels, each having an upper edge parallel to a lower edge and non-parallel side edges tapering from the lower edge to the upper edge;

a trapezoid-shaped front panel having an upper edge parallel to a lower edge and two non-parallel side edges tapering from the lower edge to the upper edge;

a trapezoid-shaped rear panel having an upper edge parallel to a lower edge and two non-parallel side edges tapering from the lower edge to the upper edge, with adjacent side edges attached together forming a pyramid-shaped chimney, the combined lower edges forming a base perimeter and the combined upper edges forming an upper perimeter; and a slide plate within the upper perimeter and a means of sliding engagement with the upper edge of the front panel and the upper edge of the rear panel, further restricting the heat output of the device through the upper perimeter below the grill surface, wherein the device is properly placed within the base portion of the patio grill with the base perimeter seated above a heat source with the upper perimeter situated just below a grill surface, the device concentrating the cooking heat and reducing the consumption of cooking fuel of the patio grill.

2. A device for insertion within a base portion of a patio grill, placed between a heat source and a grill surface of the patio grill the device comprising:

two trapezoid-shaped side panels, each having an upper edge parallel to a lower edge and non-parallel side edges tapering from the lower edge to the upper edge;

a trapezoid-shaped front panel having an upper edge parallel to a lower edge and two non-parallel side edges tapering from the lower edge to the upper edge;

a trapezoid-shaped rear panel having an upper edge parallel to a lower edge and two non-parallel side edges tapering from the lower edge to the upper edge, with adjacent side edges attached together forming a pyramid-shaped chimney, the combined lower edges forming a base perimeter and the combined upper edges forming an upper perimeter, and a means for adjusting a width of the front panel and width of the rear panel allowing the device to be used within patio grills of varied size and shape, such means including the front panel and the rear panel provided respectively in two divided sections with an adjusting panel having a plurality of riveted bats engaging linear slots in each of the two divided sections of the front panel and rear panel, allowing such front panel and the rear panel to expand and contract, wherein the device is properly placed within the base portion of the patio grill with the base perimeter seated above a heat source with the upper perimeter situated just below a grill surface, the device concentrating the cooking heat and reducing the consumption of cooking fuel of the patio grill.

* * * * *